Sept. 2, 1930.  A. F. WENDLER ET AL  1,774,860
METALLIC STRUCTURE
Filed March 8, 1926
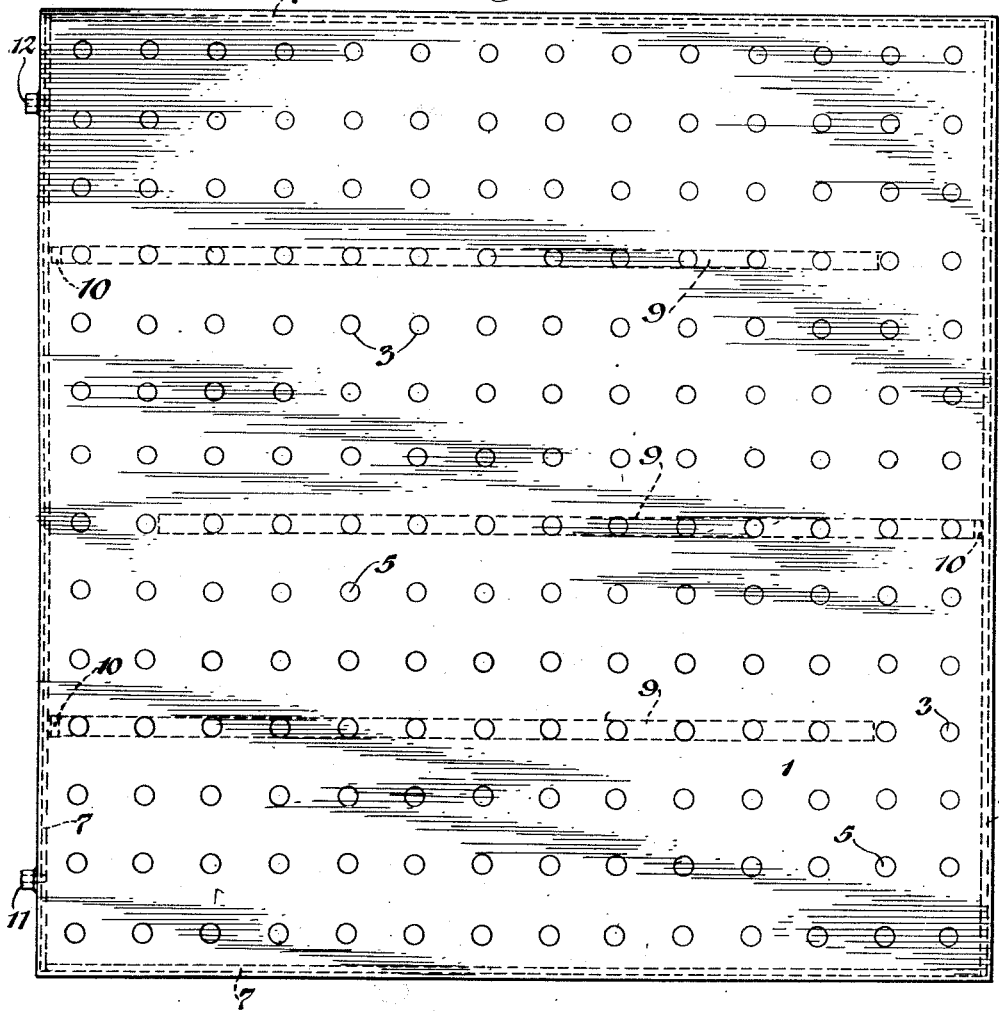
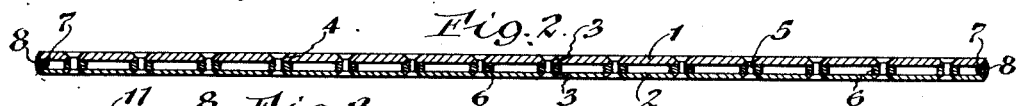
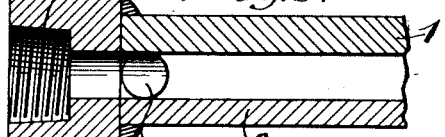
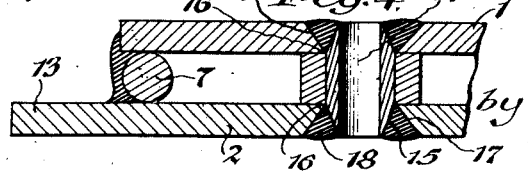
Inventor
A. F. WENDLER.
I. T. THORNTON.
by William J. Warsleke
Attorneys Patented Sept. 2, 1930

1,774,860

UNITED STATES PATENT OFFICE

ADOLPH F. WENDLER AND IRVING T. THORNTON, OF BUFFALO, NEW YORK, ASSIGNORS TO NATIONAL ANILINE & CHEMICAL CO., INC., OF NEW YORK, N. Y., A CORPORATION OF NEW YORK

METALLIC STRUCTURE

Application filed March 8, 1926. Serial No. 93,092.

This invention relates to welded metallic structures and in its specific application to a drier shelf construction.

Hollow drier shelves when welded are customarily made by bending the edges of plates and welding to such a bent edge another plate which may also be provided with a bent edge. The bending, however, results in a hump in the plate surface where the bend occurs and consequently the surface is uneven. The result is that allowance must be made for this unevenness, in mounting the shelves; otherwise pans holding material to be dried become wedged between them. Furthermore, it is difficult to manufacture such shelves with a narrow steam space on account of the difficulty encountered in bending a narrow portion of the edge; but excess steam space reduces the space available for drying. In addition, with drying shelves at present employed, vapors evolved during the drying pass to the exit duct by way of the space between the edges of the shelves and the inner wall of the drying chamber, and vapors from material on the shelves must pass between adjacent shelves to reach said space. The consequence is that the material dries unevenly, the material at the center of the shelves drying more rapidly than that at the edges.

The present invention overcomes these difficulties by substituting a form of construction, which not only gives a flat even surface but also is adapted for any thickness of steam space. This is accomplished by welding, or brazing a rod between two plates about their periphery. Bending is thereby obviated and there is no distortion of the plate. Any size of rod that is convenient can be used, and the only limitation placed thereon is sufficient space within the shelf to take care of condensation and avoid interference with the heating operation. More uniform drying is also accomplished by providing the shelves with perforations, so that the vapors evolved during the drying are permitted to pass through the shelves as well as between them.

For a more complete understanding of the invention, reference is to be had to the accompanying drawing in which Figure 1 is a plan view of a shelf;
Figure 2 is a cross-section thereof;
Figure 3 is an enlarged partial cross-section through an inlet; and
Figure 4 is an enlarged cross-section of a modification.

Upper and lower plates 1 and 2 have at regular intervals holes 3 punched in them. These holes are countersunk as at 4, and rivets 5 extend from one plate to the other through these holes. The rivets are flush with the upper surface of the top plate and spacers 6 about the rivets hold the plates apart the desired distance. Between the plates adjacent their periphery is a rod or rods 7, secured to them by welding material 8. Rod 7 is preferably of round cross-section so that the welding material 8 has a wedge-like form, and has extended contact with each plate and the rod, while the amount of welding material required is relatively small. The plates contact directly with the rod and the rod diameter is the same as the desired space between the plates. Electric welding is preferred in constructing the shelves as the heat is localized, and warping due to uneven heating is minimized.

For directing the flow of a heating medium, baffle bars 9 are provided, which also serve as spacers and have openings through them for the reception of rivets. These bars alternately contact with opposite rods 7, forming a winding passage for the heating medium; and, if desired small openings 10 can be made in the bars near their contacting ends to provide passages for draining condensate. Couplings 11 and 12 provide an inlet and an outlet for the heating medium.

The inlet and outlet couplings 11 and 12 are, for simplicity and ease of assemblage, welded to the edge of the plate after the shelf has been formed. At the location selected for the coupling, a hole of a proper size is drilled through the rod and the welding metal, and the coupling is welded to the edge of the plates.

The upper plate 1 is preferably made of thicker metal than the lower plate 2, shown in Figure 3, as it is found that corrosion of the lower or interior surface of the upper plate takes place while the lower plate shows practically no corrosion. The thicker upper plate therefore increases the life of the shelf very materially.

In the drying of acid-containing materials, it is found that the acids corrode the lower or exposed surface of the lower plate 2. Consequently in driers for such materials, the lower plate is also thickened to take care of corrosion as disclosed in Figure 4. This figure also illustrates a construction wherein one of the plates projects beyond the other thereby providing a flange 13.

In Figure 4 there is further disclosed a construction primarily for the purpose of supplying perforations extending through the shelf. Tubes 14 have beveled edges 15; the plates have openings 16 for receiving the tubes and are provided with countersinks 17. With a tube in place, the beveled edge and the countersink form a circular channel which is filled with welding material or other metallic filler 18. By means of this modified construction, ventilation throughout a tier of shelves is provided in conjunction with a structure which is rugged and readily built.

While the above disclosures are directed to a drier shelf, the invention finds application in other fields where a hollow metallic construction is useful, such as headers, jacketed vessels or tubes, and the like. Furthermore other materials, such as galvanized plate, copper, etc., can be used; and in the case of copper or the like, brazing is substituted for welding. Accordingly the invention is not to be specifically construed but it is to be given an interpretation commensurate with the appended claims.

What is claimed is:

1. A drier shelf comprising in combination spaced metallic plates, spacing means of substantially circular cross section between said plates and adjacent the periphery of one of said plates, and a weld connection securing said plates to each other and to the spacing means.

2. A drier shelf comprising upper and lower parallel spaced perforate plates, a plurality of elements connecting said upper and lower plates, said elements comprising an outer ring abutting the inner surfaces of said plates and an inner tubular member in contact with said outer ring and extending through the perforations in said plates to the outer surfaces of said plates.

3. A drier shelf comprising upper and lower spaced perforate plates, a plurality of elements connecting said upper and lower plates, said elements comprising an outer ring abutting the inner surfaces of said plates, an inner tubular member in contact with said outer ring and extending through the perforations in said plates to the outer surfaces of said plates, the outer edges of said inner tubular member being beveled, and a metallic filler securing said plates to said beveled edges.

4. A drier shelf comprising in combination a flat lower plate, a flat upper plate substantially greater in thickness than said lower plate, spacing means between said plates adjacent their peripheries, a weld connection securing said plates to each other and to the spacing means, tubular elements connecting and supporting said upper and lower plates, said tubular elements being beveled on the outside edge to correspond with beveled holes in said upper and lower plates in which said tubular elements are fitted, and weld connections securing said plates to said tubular elements.

5. A drier shelf comprising in combination a flat lower plate, a flat upper plate substantially greater in thickness than said lower plate, spacing means of substantially circular cross section between said plates adjacent the periphery of one of said plates, and a metallic filler securing said plates to each other and to the spacing means, and means for admitting steam to the space between said plates.

6. A drier shelf comprising upper and lower parallel spaced, perforate plates, tubular elements within said perforation and connecting said upper and lower plates, and annular elements between said plates 4 supporting said plates in spaced relation.

7. A shelf drier having upper and lower parallel spaced, perforate plates, spacing means of substantially circular cross section between said plates and adjacent the periphery of one of said plates, a weld connection securing said plates to each other and to said spacing means, tubular elements within said perforations and connecting said plates, and annular elements between said plates 4 supporting said plates in spaced relation.

8. A drier shelf comprising a flat lower plate and a flat upper plate, said plates having openings therein and said openings being countersunk, a rod between said plates adjacent their peripheries, said rod being circular in cross-section, a weld connection securing said plates to each other and to said rod, tubular elements connecting said upper and lower plates, said elements being located in the openings in said plates and being beveled on the outside edges to a degree corresponding with the countersinking of said openings, thereby forming circular channels, sealing material in said channels and connecting said plates and said tubular elements, and spacing rings between said plates and about said tubular elements.

In testimony whereof we affix our signatures.

ADOLPH F. WENDLER.
IRVING T. THORNTON.